May 5, 1931.  I. M. PETERSIME  1,803,975
BAKING OVEN
Filed Sept. 19, 1927    5 Sheets-Sheet 1

INVENTOR
IRA M. PETERSIME,
BY
ATTORNEYS

May 5, 1931. I. M. PETERSIME 1,803,975
BAKING OVEN
Filed Sept. 19, 1927   5 Sheets-Sheet 2
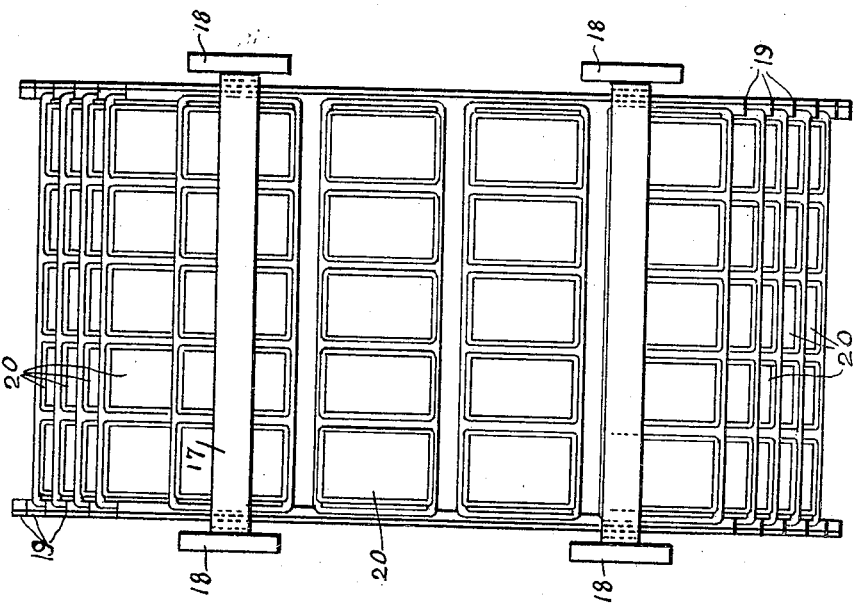
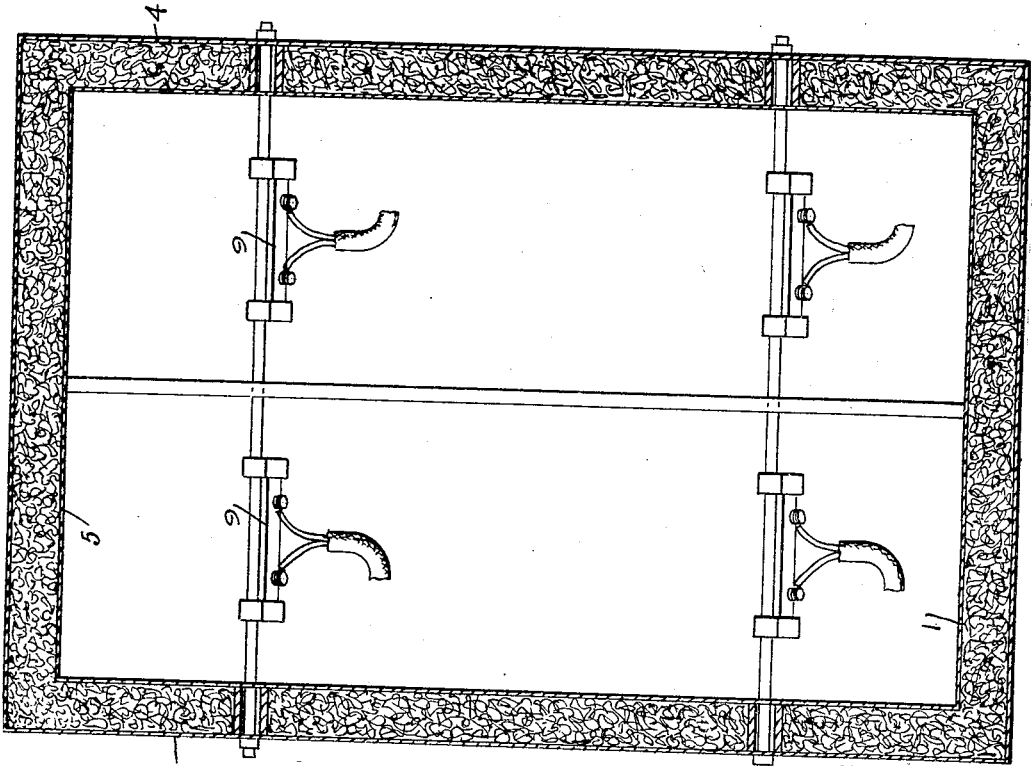
INVENTOR
IRA M. PETERSIME,
BY Toulmin & Toulmin
ATTORNEYS

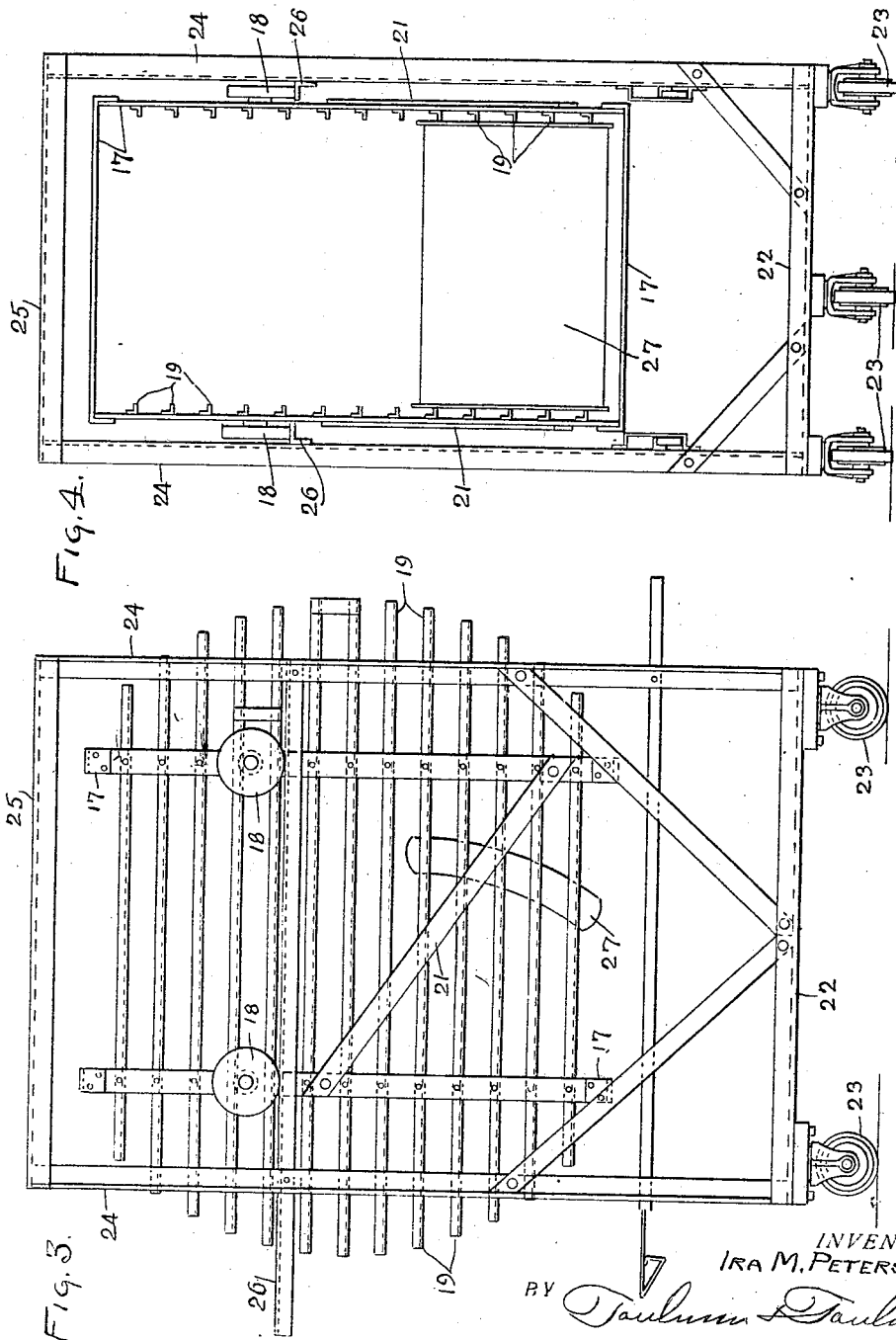

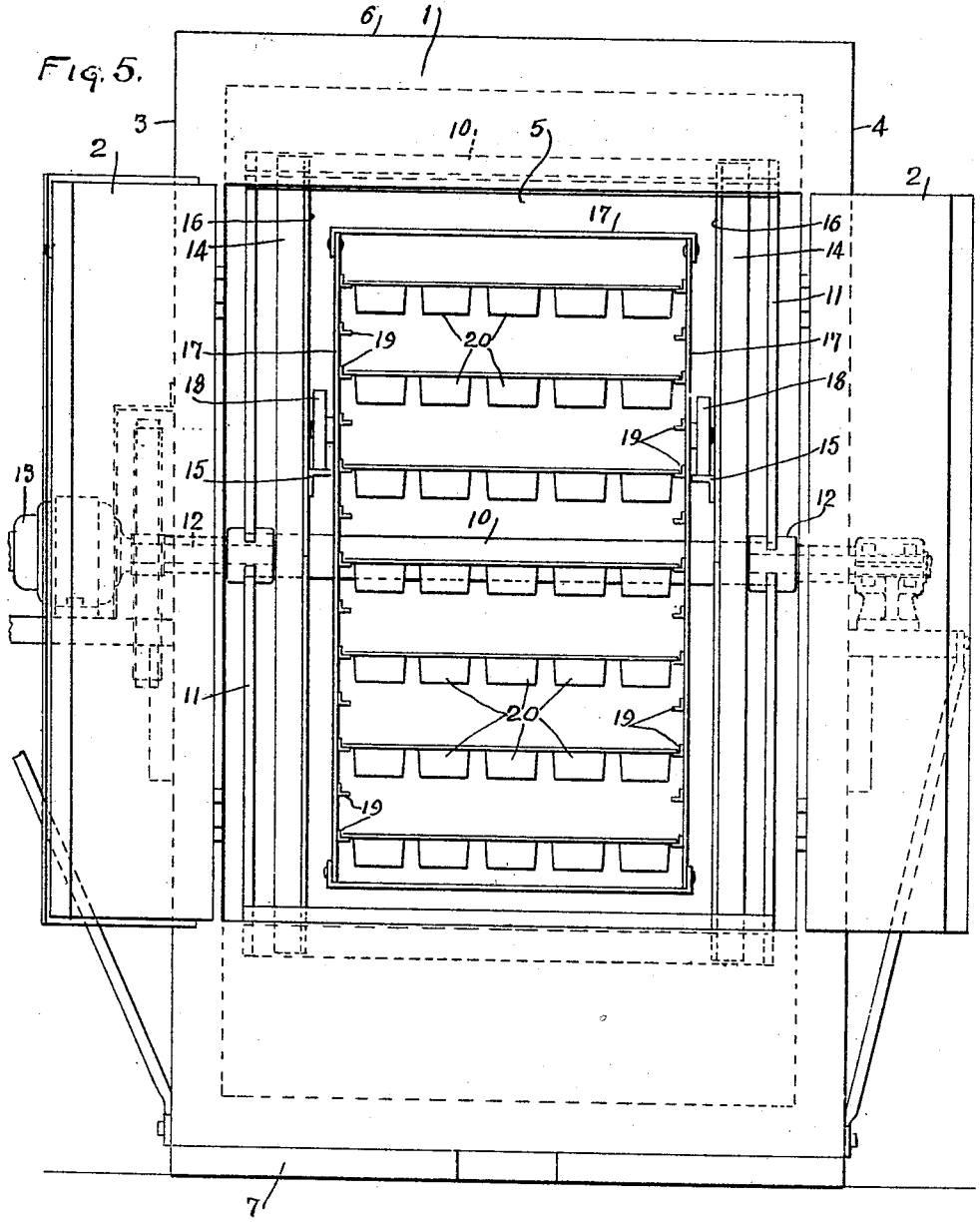

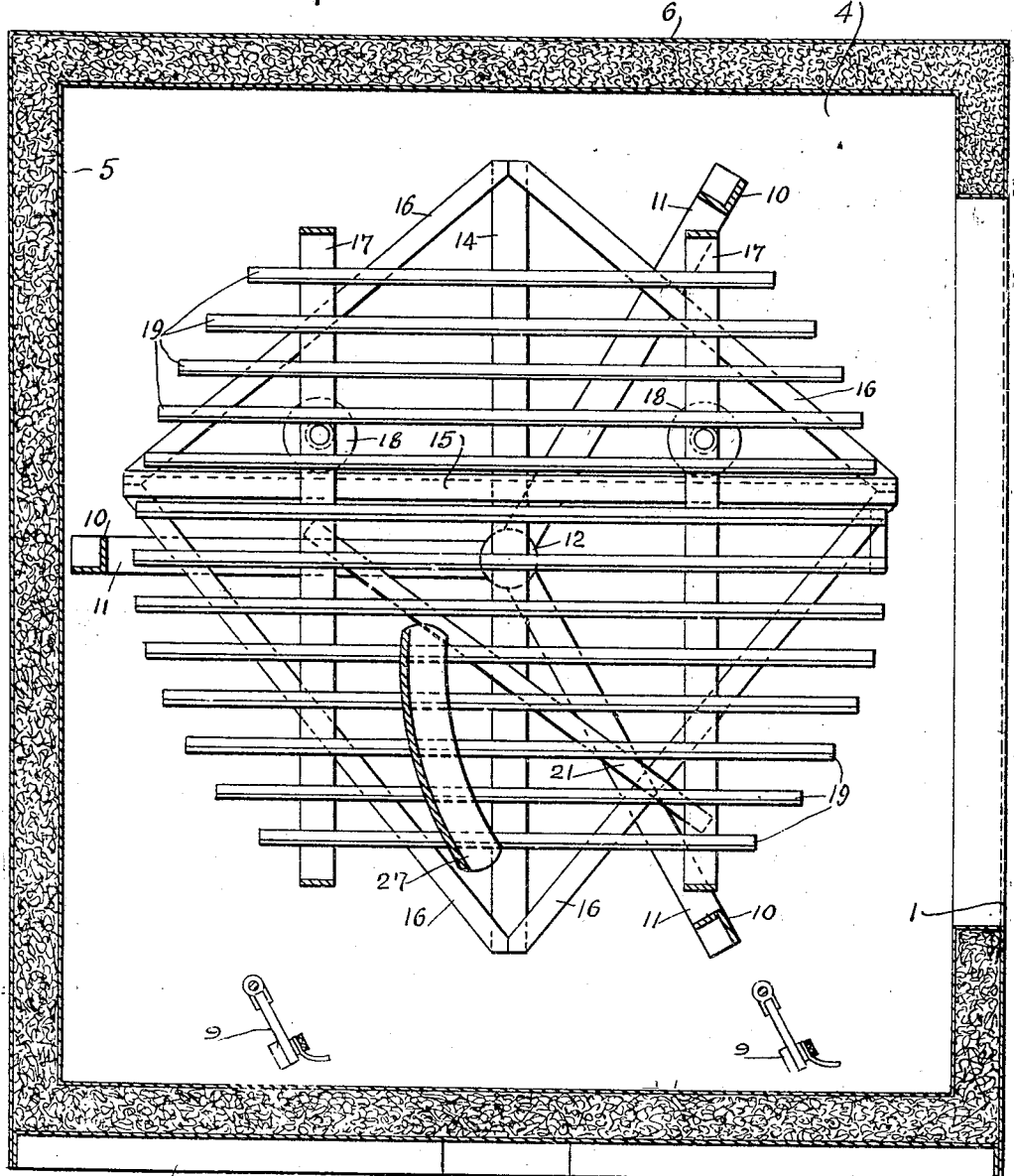

Patented May 5, 1931

1,803,975

UNITED STATES PATENT OFFICE

IRA M. PETERSIME, OF GETTYSBURG, OHIO

BAKING OVEN

Application filed September 19, 1927. Serial No. 220,480.

My invention relates to baking ovens.

It is the object of my invention to provide a baking oven for bread in bakeries, cores in foundries or for any other objects which must be baked at a uniform temperature.

It is the object of my invention to provide an oven in which the temperature will be maintained uniformly throughout the entire oven so that the articles therein will be uniformly baked.

It is a further object to provide means of so deflecting the heat and the churning of the air that certain areas which may normally be hotter or cooler may have the air uniformly distributed through them in properly heated condition so as to prevent any lack of uniformity of treatment of the product in the oven.

It is a further object of my invention to provide means of loading and unloading the oven so that it will be open for the minimum of time, so it will be unnecessary for the operator to come closer to the oven than the doors and so that the time formerly utilized for allowing the oven to cool before removing its contents may be entirely eliminated, thus securing continuous production from a given oven and reducing the number of ovens necessary to secure any given production, while at the same time saving in the dissipation of heat consequent upon the chilling of the oven. It is an additional object to provide means for carrying portable racks to and from the oven so that the contents of the oven may be in transit continuously to the oven and from it, thereby enabling a single operator to control a number of ovens and thus greatly reduce labor expense.

Referring to the drawings:

Figure 2 is a section on the line 2—2 of Figure 1, looking in the direction of the arrows, showing the arrangement of the heating elements.

Figure 3 is a side elevation of the car and portable rack.

Figure 4 is a front elevation of the car and rack showing the deflector shield in position.

Figure 5 is a front elevation with the doors open of the oven with the rack in position, carrying the contact pans.

Figure 6 is a section on the line 6—6 of Figure 1, looking in the direction of the arrows, showing the arrangement of the stirrer reel rack, track and supporting frame.

Figure 7 is a top plan view of the rack with the baking pans in position.

Figure 1:
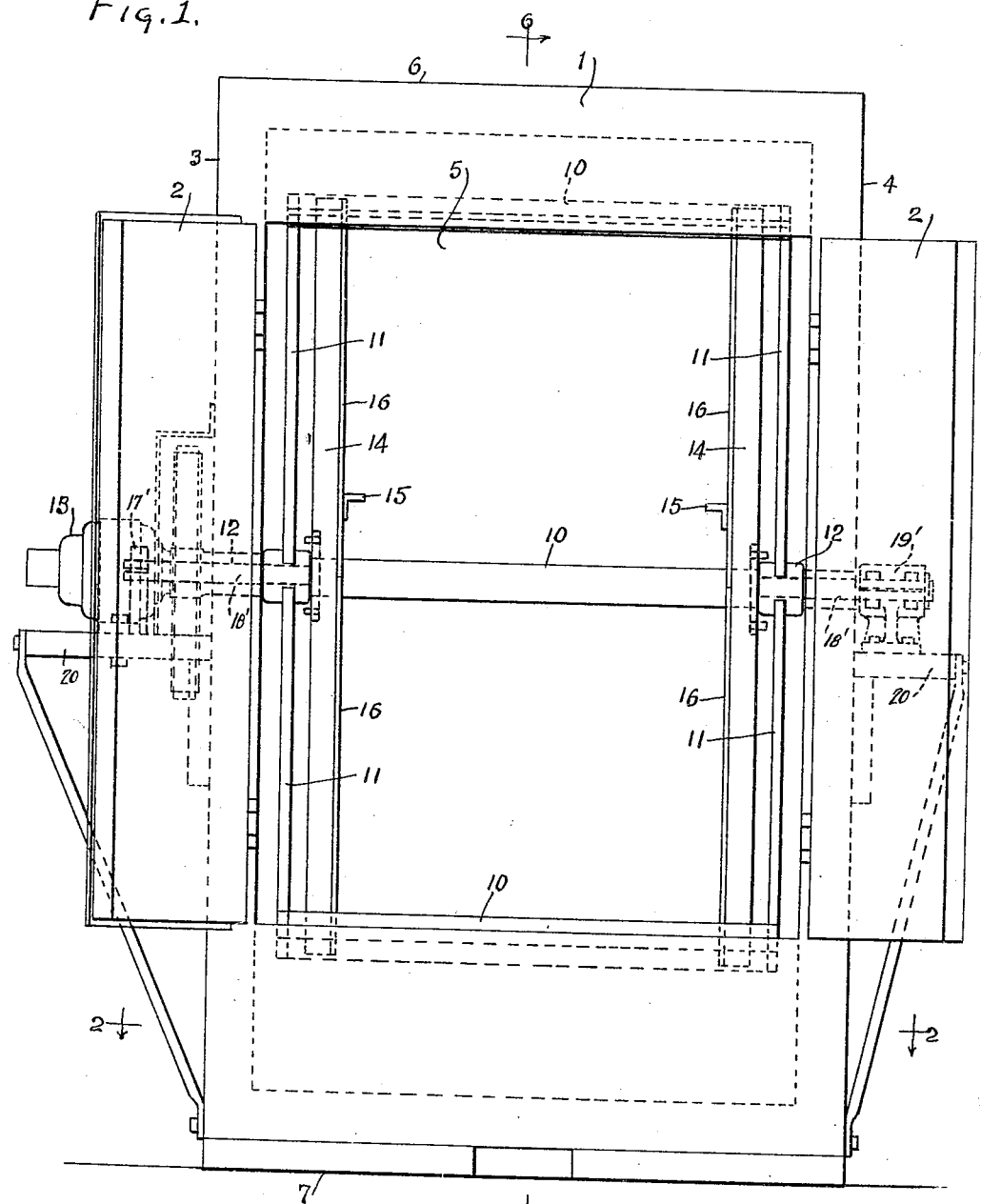
Figure 1 is a front elevation of the oven with the doors open.

Referring to the drawings, 1 designates the front wall of the oven which is provided with the doors 2. 3 and 4 designate the side walls of the oven, and 5 the back thereof. 6 and 7 designate the top and bottom respectively.

The oven walls are preferably made on the exterior of black sheet steel, on the interior of non-corrosive metal customarily used in ovens, with any desired filler between the walls, which is a non-conductor of heat, or the air space between the walls may be sufficient under certain conditions of temperature. The interior of the oven and the bottom thereof are provided with a plurality of heating elements 9, which are electrically heated. Above the heating elements there is a stirrer consisting of a plurality of transverse members 10 and arms 11. The arms are attached to sleeve members 12 and 12', which are rotatably supported in the side walls of the oven and are driven by means of a motor 13.

Within this stirrer reel is located a frame on each side, consisting of an upright 14, horizontal members 15 and braces 16. This frame has rigidly attached thereto, and extending outwardly through bearing sleeves 12, shafts 18'. The outer ends of these shafts are supported in mountings 17' and 19'. These mountings are supported by brackets 20 located without the oven and on the side walls thereof.

On the sleeve member 12' is a pulley 13' geared to a pulley on the motor shaft for the purpose of rotating the stirrer. It is obvious from an inspection of Figures 1 and 5 that the shafts 18' are supported in the mountings 17' and 19', and have on the inner ends thereof a frame for supporting trays. Revolving or rotating around the shafts 18' are the bearing sleeves 12 and 12'. These bearing sleeves have attached thereto the stirrer and rotate on the shaft 18' between the mountings 17' and 19'.

The horizontal members 15 constitute a track on which the cage carrying the articles to be baked travels. The cage consists of vertical and transverse frame members 17 having side wheels 18 traveling on the horizontal members 15.

A plurality of side horizontal supporting strips 19 support the articles, such as the baking trays 20. The vertical members of the cage designated 17 are provided with diagonal braces 21. Thus the case may be moved into or out of the oven through the reel on the track 15 without the necessity of the operator getting into the oven in any way as the cage can be reached by a hook and pulled out of the oven onto the car hereinafter described.

This car consists of a lower frame work 22 and wheels 23, the frame work being provided at its corners with a plurality of uprights 24 joined at the top by the transverse members 25. A track is provided on either side of these upright frame members on the inside thereof, as at 26, which track corresponds in height to the track in the oven. The cage is moved out of the oven so that its wheels 18 run onto the track 26, and then the cage with its contents can be wheeled away and a new cage wheeled up to the oven.

The baffle plate 27 is a semicircular sheet of metal suspended between the horizontal bars 19 of the tray-supporting cage. It serves to direct the churned air into the center of the cage in order to insure uniformity of temperature in the central portion of the cage, and to deflect the rising heat in such a manner as to not create too great a temperature in the central area where the air is relatively still.

I desire to comprehend within my invention such modifications as may be clearly embraced within my claims and the scope of my invention.

Having thus fully described my invention, what I claim is new and desire to secure by Letters Patent, is:

1. In an oven the combination of a casing having doors, a frame on either side of the oven on the inside thereof carrying a track, a rack adapted to move on said track and to be detached bodily from the oven, and stirrer members adapted to move around the rack across the ends thereof and the top and bottom, and heating means below said rack.

2. In combination, an oven having doors, a rack detachably mounted in said oven adapted to pass through said doors, a track for supporting said rack, said rack being composed of spaced vertical side members, and transverse connecting horizontal members, wheels on said vertical members to ride on said track, and guiding supports mounted on said vertical members horizontally in spaced relationship for supporting trays of articles to be baked, a spider mounted on either side of said rack on the outside thereof, and transverse stirrer arms mounted on the ends of said spider for movement about said rack.

3. In combination, an oven having doors, a rack detachably mounted in said oven adapted to pass through said doors, a track for supporting said rack, said rack being composed of spaced vertical side members, and transverse connecting horizontal members, wheels on said vertical members to ride on said track, and guiding supports mounted on said vertical members horizontally in spaced relationship for supporting trays of articles to be baked, a spider mounted on either side of said rack on the outside thereof, and transverse stirrer arms mounted on the ends of said spider for movement about said rack, said transverse arms being angular in cross section.

4. In combination, an oven having doors, a rack detachably mounted in said oven adapted to pass through said doors, a track for supporting said rack, said rack being composed of spaced vertical side members, and transverse connecting horizontal members, wheels on said vertical members to ride on said track, and guiding supports mounted on said vertical members horizontally in spaced relationship for supporting trays of articles to be baked, a spider mounted on either side of said rack on the outside thereof, and transverse stirrer arms mounted on the ends of said spider for movement about said rack, and deflecting means carried by said rack to deflect the movement of the air to insure uniformity of temperature on the exterior of the rack.

5. In an oven, a supporting track rigidly mounted thereon, a stirrer mounted in said over for rotation around said supporting track, and a rack adapted to be placed in said oven on said track.

6. In an oven, a supporting track rigidly mounted in said oven, a rack adapted to be placed in said oven on said track, a stirrer mounted in said oven for rotation around said supporting track and the rack on said track, and a common support for the track and the stirrer.

7. In an oven, a supporting track in said oven, a stirrer mounted in said oven for rotation about said track, and a rack adapted to be placed in said oven on said track.

8. In an oven, a supporting track in said oven, a stirrer mounted in said oven for rotation about said track, a rack adapted to be placed in said oven on said track, and a common support for the track and the stirrer.

In testimony whereof, I affix my signature.

IRA M. PETERSIME.